United States Patent
Numrich et al.

(10) Patent No.: US 10,745,580 B2
(45) Date of Patent: Aug. 18, 2020

(54) SURFACE-FINISHING ON THE BASIS OF CROSS-LINKABLE, SATURATED POLYESTER RESINS AND FLUOROPOLYMERS

(71) Applicant: Evonik Operations GmbH, Essen (DE)

(72) Inventors: Uwe Numrich, Groß-Zimmern (DE); Thorsten Brand, Marl (DE); Andreas Schubert, Mülheim an der Ruhr (DE); Thomas Mohr, Haltern am See (DE); Denis Pukrop, Dülmen (DE)

(73) Assignee: Evonik Operations GmbH, Essen (DE)

( * ) Notice: Subject to any disclaimer, the term of this patent is extended or adjusted under 35 U.S.C. 154(b) by 173 days.

(21) Appl. No.: 15/504,046

(22) PCT Filed: Aug. 18, 2015

(86) PCT No.: PCT/EP2015/068891
§ 371 (c)(1),
(2) Date: Feb. 15, 2017

(87) PCT Pub. No.: WO2016/037807
PCT Pub. Date: Mar. 17, 2016

(65) Prior Publication Data
US 2018/0215944 A1 Aug. 2, 2018

(30) Foreign Application Priority Data
Sep. 11, 2014 (DE) .......................... 10 2014 218 188

(51) Int. Cl.
| | | |
|---|---|---|
| C09D 127/18 | (2006.01) | |
| C09D 167/02 | (2006.01) | |
| C09D 175/06 | (2006.01) | |
| C08G 18/42 | (2006.01) | |
| C08G 18/50 | (2006.01) | |
| C08G 18/40 | (2006.01) | |
| C08K 5/00 | (2006.01) | |
| C09D 127/12 | (2006.01) | |
| C08L 27/18 | (2006.01) | |

(52) U.S. Cl.
CPC ....... *C09D 127/18* (2013.01); *C08G 18/4018* (2013.01); *C08G 18/423* (2013.01); *C08G 18/4236* (2013.01); *C08G 18/5015* (2013.01); *C09D 167/02* (2013.01); *C09D 175/06* (2013.01); *C08K 5/005* (2013.01); *C08L 27/18* (2013.01); *C09D 127/12* (2013.01)

(58) Field of Classification Search
CPC .. C09D 127/18; C09D 175/06; C09D 167/02; C09D 127/12; C08G 18/5015; C08G 18/4018; C08G 18/423; C08G 18/4236; C08L 27/18; C08K 5/005

USPC ....................................................... 427/385.5
See application file for complete search history.

(56) References Cited

U.S. PATENT DOCUMENTS

| | | | |
|---|---|---|---|
| 4,879,344 A * | 11/1989 | Woo ......................... | C08F 8/42 |
| | | | 525/100 |
| 5,040,273 A | 8/1991 | Hoffman et al. | |
| 6,365,276 B1 | 4/2002 | Rudisi et al. | |
| 7,176,250 B2 | 2/2007 | Asakawa et al. | |
| 7,947,781 B2 | 5/2011 | Arndt et al. | |
| 8,053,522 B2 | 11/2011 | Loehden et al. | |
| 8,084,136 B2 | 12/2011 | Loehden et al. | |
| 8,088,847 B2 | 1/2012 | Numrich et al. | |
| 8,178,630 B2 | 5/2012 | Koschabek et al. | |
| 8,192,844 B2 | 6/2012 | Numrich et al. | |
| 8,206,782 B2 | 6/2012 | Numrich et al. | |
| 8,383,728 B2 | 2/2013 | Brenner et al. | |
| 8,901,231 B2 | 12/2014 | Brand et al. | |
| 9,371,411 B2 | 6/2016 | Arpac et al. | |
| 2007/0213465 A1 | 9/2007 | Brand et al. | |
| 2008/0193729 A1 | 8/2008 | Arndt et al. | |
| 2010/0028697 A1 | 2/2010 | Koschabek et al. | |
| 2010/0056662 A1 | 3/2010 | Spyrou et al. | |
| 2011/0097562 A1* | 4/2011 | Brill ................... | C09K 19/3833 |
| | | | 428/212 |
| 2012/0063952 A1* | 3/2012 | Hong ..................... | B32B 27/18 |
| | | | 422/24 |
| 2013/0289154 A1 | 10/2013 | Spyrou et al. | |
| 2014/0144427 A1 | 5/2014 | Numrich et al. | |
| 2014/0350211 A1 | 11/2014 | Hennig et al. | |

(Continued)

FOREIGN PATENT DOCUMENTS

| | | | |
|---|---|---|---|
| AU | 2002332335 B2 | 1/2008 | |
| DE | 102004008772 A1 | 9/2005 | |
| EP | 2868724 A1 | 5/2015 | |
| JP | H01190744 A * | 7/1989 | ............. C08L 27/12 |
| JP | H101190744 A | 7/1989 | |
| JP | 03-098276 A | 4/1991 | |

(Continued)

OTHER PUBLICATIONS

Dow (NPL titled: Xiameter RSN-0255 Resin ([Datasheet [online]. Dow [retrieved on Jan. 3, 2019], Retrieved from the Internet: <URL: http://twinstar-corp.com.tw/wp-content/uploads/2012/05/dow-corning-resin/RSN-0255.pdf> (Year: 2012).*

(Continued)

*Primary Examiner* — Hai Y Zhang
(74) *Attorney, Agent, or Firm* — Nexsen Pruet PLLC; Philip P. McCann

(57) ABSTRACT

A formulation for the coating of substrates, the formulation including 5 to 70 wt % of hydroxy-functional fluoropolymers, 5 to 70 wt % of polyesters based on dicarboxylic or polycarboxylic acids or derivatives thereof and on aliphatic or cycloaliphatic diols or polyols, the polyester including at least one aliphatic or cycloaliphatic dicarboxylic acid or polycarboxylic acid or derivatives thereof, 2 to 25 wt % of crosslinkers, 0.01 to 2 wt % of crosslinking catalysts, up to 20 wt % of UV absorbers and up to 10 wt % of UV stabilizers.

12 Claims, No Drawings

(56) References Cited

U.S. PATENT DOCUMENTS

| | | | |
|---|---|---|---|
| 2015/0072151 A1* | 3/2015 | Saito | ............ C23C 26/00 428/421 |
| 2016/0017165 A1 | 1/2016 | Numrich et al. | |
| 2016/0311949 A1 | 10/2016 | Haberkom et al. | |

FOREIGN PATENT DOCUMENTS

| | | |
|---|---|---|
| JP | 10-324843 A | 8/1998 |
| JP | 2014218630 A | 11/2014 |
| WO | 9960066 A1 | 11/1999 |
| WO | 03029368 A1 | 4/2003 |
| WO | 2005040273 A1 | 5/2005 |
| WO | 2005090428 A1 | 9/2005 |
| WO | 2005110745 A1 | 11/2005 |
| WO | 2006084611 A1 | 8/2006 |
| WO | 2007073952 A1 | 7/2007 |
| WO | 2007074138 A1 | 7/2007 |
| WO | 2007098816 A2 | 9/2007 |
| WO | 2007098819 A1 | 9/2007 |
| WO | 2008037535 A1 | 4/2008 |
| WO | 2008049679 A1 | 5/2008 |
| WO | 2008068068 A1 | 6/2008 |
| WO | 2008080644 A1 | 7/2008 |
| WO | 2009021763 A1 | 2/2009 |
| WO | 2009021779 A1 | 2/2009 |
| WO | 2011073006 A1 | 6/2011 |
| WO | 2012048650 A1 | 4/2012 |
| WO | 2013037632 A2 | 3/2013 |
| WO | 2013092273 A1 | 6/2013 |
| WO | 2014002964 A1 | 1/2014 |
| WO | WO-2014002964 A1 * 1/2014 ............ C09D 5/03 |
| WO | 2014139752 A1 | 9/2014 |
| WO | 2016037807 A1 | 3/2016 |

OTHER PUBLICATIONS

Andriot et al. (Silicones in Industrial Applications ([Datasheet [online]. ResearchGate [retrieved on Jan. 3, 2019], Retrieved from the Internet: <URL: https://www.researchgate.net/profile/Ernst_Gerlach/publication/251935579_Silicones_in_Industrial_Applications/links/554a8fbf0cf29752ee7c1c52.pdf> (Year: 2009).*
JPH01190744A English translation. (Year: 2019).*
EIC Search report, 2019. (Year: 2019).*
German language Written Opinion dated Oct. 26, 2015 in PCT/EP2015/068891 (7 pages).
German language International Search Report dated Oct. 26, 2015 in PCT/EP2015/068891 (4 pages).
International Search Report dated Oct. 26, 2015 in PCT/EP2015/068891 (3 pages).
Lumiflon LF-710F Resin Product Data Sheet, Feb. 2017, pp. 1-2, http://lumiflousa.com/wo-content/uploads/LUMIFLON_LF_740F.pdf (2 pages).

* cited by examiner

SURFACE-FINISHING ON THE BASIS OF CROSS-LINKABLE, SATURATED POLYESTER RESINS AND FLUOROPOLYMERS

This application is a national stage application under 35 U.S.C. § 371 of International Application No. PCT/EP2015/068891 filed 18 Aug. 2015, which claims priority to German Application No. 102014218188.7 filed 11 Sep. 2014, the disclosures of which are expressly incorporated herein by reference.

FIELD

The present invention relates to a technology for the furnishing of materials, especially metallic materials for exposed outdoor use, with a high-grade, weathering-resistant coating. Fundamental to this technology is the combination of "long life from an aesthetic standpoint" with the conventional criteria of high-performance corrosion control.

BACKGROUND

Exposure caused by weathering is unavoidable for materials in outdoor use. Such exposure results in particular from the UV component of solar radiation, via a great variety of different corrosion mechanisms, by cleaning operations, by wind-borne media (sand, dust), or by other, corresponding exposures in the specific application scenario. Unprotected or inadequately surface-coated materials lose their integrity and/or durability as a result. Materials based on metal substrates are subject, moreover, to a considerable potential for corrosion, thereby giving particular importance to the corrosion control aspect of the inventive coating.

WO 2014002964 describes powder coating formulations based on fluoropolymer resin and polyester polymers, this being an incompatible system with controlled separation of the two species.

Furthermore, the polyester component contains aromatic structural units which in principle, owing to their instability under the effect of solar radiation, are counterproductive for exposed outdoor use, from an aesthetic standpoint.

JP03-098276 A describes a formulation for powder coating, consisting of, among other components, a fluoropolymer and a crosslinkable polyester component. This formulation technology, however, is not specifically designed for demanding outdoor use.

JP10-324843 A describes a coating resin formulation featuring a combination of weathering resistance and oil resistance, and also with the focus of an extremely low solvent fraction, based on a hydroxy-functional fluoropolymer having a defined (high) OH number; the design of this formulation is guided by the intended establishment of a very high oil resistance.

In this case, aromatics-based polyester formulations are permitted, such formulations being known to exhibit deficiencies in sustained weathering stability.

DE 10 2004 008 772 A1 describes an abrasion-resistant, alkali-resistant coating and also resultant moldings having a low-energy surface, with specific fluoropolymers being among the constituents.

The focus in this case, however, or the design of the formulation, is not on the provision of the surface profile of a combination of sustained corrosion control with outstanding—aesthetically sustained—surface coating.

AU 2002332335 B2 or WO 03/029368 A1 describes a powder coating formulation prepared from a fluoropolymer resin-based mixture with individual components with different glass transition temperatures, the aim being to ensure a combination of properties of sufficiently high blocking resistance on the one hand and also ease of processing at low temperatures on the other hand.

In this case it is likewise possible—optionally—for polyester resins to be employed. In this case, however, the formulation is not designed with the focus on a combination of sustained corrosion control with outstanding—aesthetically sustained—surface coating.

U.S. Pat. No. 6,365,276 B1 describes a coated metal article (produced by continuous coil coating), involving the use of an expensive fluoroethylene-vinyl ether-based coating formulation. In this case there is no further (co)binder employed, providing the possibility of little cost efficiency.

In diverse webinars (with a date of 13 Aug. 2014, for example), Asahi Glass Co. Chemicals, Lumiflon USA Division, has described the use of low molecular mass polyester diols (K-Flex 188, King Industries USA) as additive resins, admixed at comparatively low concentrations. Polyester diols of this kind, however, are unsuitable as co-binders and for the preparation of binder mixtures. The adverse effect on flexibility would be too great in this case.

The most widely known prior art in relation to corrosion-resistant and weather-resistant surface coating and surface decoration in the context of coil coating is practiced with what are called PVDF coating materials, but these materials have distinct design disadvantages since only the medium gloss range (25-35 gloss units, measured in the Gardner test at 60°) can be realized. Furthermore, coatings of this kind have a comparatively low surface hardness.

SUMMARY

The object of the present invention lies in the provision of improved coatings, especially for metallic materials, which ideally permit sustained corrosion control, can be used as color-imparting coatings or decoration, permit a design-compatible surface finish (high gloss, medium gloss, matt), and enable a sustained surface coating.

With this surface enhancement, therefore, it is to be possible to ensure particularly good surface hardness (abrasion resistance, scratch resistance), weathering resistance and substrate protection properties in demanding interior applications and also, in particular, outdoor applications, at one and the same time.

Furthermore, the surface enhancement is to be easy and cost-effective to produce and to apply.

Further objects, not specifically stated, may become apparent from the description, from the claims or else from the examples of this patent specification.

Against the background of the prior art and the deficient technical solutions described therein, success is achieved in the present invention, in a manner not readily foreseeable by the skilled person, in providing a coating having a quality which is improved over a long period of time, and hence in fulfilling the complex profile of requirements specified above.

Essential to the present invention is the preparation of compatible mixtures—not obvious for the skilled person—of polyester polyols with fluoropolymer polyols, more particularly mixtures of this kind that fulfil the complex profile of requirements specified above.

DETAILED DESCRIPTION

A first subject of the present invention, accordingly, is a formulation for the coating of substrates, comprising 5 to 70 wt % of hydroxy-functional fluoropolymers, 5 to 70 wt % of polyesters based on dicarboxylic or polycarboxylic acids or derivatives thereof and on aliphatic or cycloaliphatic diols or polyols, the polyester necessarily comprising at least one aliphatic or cycloaliphatic dicarboxylic acid or polycarboxylic acid or derivatives thereof, 2 to 25 wt % of crosslinkers, 0.01 to 2 wt % of crosslinking catalysts, up to 20 wt % of UV absorbers and up to 10 wt % of UV stabilizers.

In one preferred embodiment of the present invention, the fluoropolymers and the polyesters in total make up preferably 20 to 75 wt % of the formulation.

The weight figures for the individual constituents of the formulations of the invention may be varied freely within the limits stated above, subject to the proviso that they add up in total to 100 wt %.

The coatings produced by means of the formulations of the invention are notable for a sustained barrier towards corrosive media, high resistance towards effects of weathering and of erosion, sufficient elasticity under creasing and bending exposure, and chemical resistance with respect to cleaning products and graffiti removers. Furthermore, the coatings based on the formulations of the invention have a dirt-repellent character, a favorable cost/benefit ratio, and sufficient opacity or hiding power in the case of a color-imparting coating at low coating thicknesses—that is, they exhibit very good pigment dispersity. With these coatings, accordingly, it is possible to achieve sustained surface coating, and to do so with high design diversity, through the possibility, for example, of producing alternatively high-gloss, medium-gloss or matt surface finishes.

Likewise in the context of the use of painted metal surfaces in interior applications, especially in relation to "white goods" (ovens, refrigerators, washing machines, dishwashers, etc.), the effect of the surface coating of the invention is that of an attractive benefit, by virtue of its corrosion control properties, the high light stability and the pronounced surface hardness.

The substrates coated in accordance with the invention therefore have the following advantages over the prior art:

The coatings of the invention are particularly color-stable and do not turn cloudy under the influence of moisture. The coating, moreover, exhibits excellent weathering resistance and very good chemical resistance, against all customary commercial cleaning products, for example. These aspects contribute to retention of surface quality over a long period of time.

The coatings of the invention, in particular under mechanical load on the surface, have very good properties. This prolongs the lifetime of the substrates even in regions with regular sandstorms and/or winds of high dust content, or under regular brush cleaning of the surface.

Furthermore, the coating of the invention is particularly moisture-stable, especially with respect to rainwater, atmospheric humidity or dew. This coating, accordingly, does not display the known susceptibility to delamination of the coating from the substrate under the influence of moisture. Furthermore, fluorine-based coatings exhibit a particularly good barrier effect with respect to water and oxygen, and therefore have very good properties in the context of sustained corrosion control.

The coatings of the invention, moreover, have very good surface hardness, and so this effect makes an additional contribution to the long life of substrates furnished accordingly.

An essential constituent of the formulations of the invention are the hydroxy-functional fluoropolymers. These are specific copolymers which are based on structural units of a fluorinated polymer and also on at least one further structural unit, which differs from the fluorinated polymer structural unit.

With more particular preference, the hydroxy-functional fluoropolymers used in the formulations of the invention are preferably copolymers of tetrafluoroethylene (TFE) and/or chlorotrifluoroethylene (CTFE) on the one hand and of vinyl esters, vinyl ethers and/or alpha-olefins on the other hand, or corresponding mixtures.

The hydroxy-functionality in such polymers is obtained, for example, with copolymerization of hydroxy-functional vinyl ethers and/or alpha-olefins.

Examples of hydroxy-functional fluoropolymers that are suitable in accordance with the invention are the commercially available products from Asahi Glass Chemicals under the product name Lumiflon®, from Daikin under the product names Zeffle®, from Central Glass Co. under the product names Cefral Coat® and Cefral Soft®, from Qingdao Hongfen Group Co. under the product name HFS-F-3000, and from Xuzhou Zhongyan Fluoro Chemical Co. under the product name ZY-2.

A further constituent of the formulations of the invention are the polyesters included. The polyesters included in the formulations of the invention are based on aliphatic or cycloaliphatic dicarboxylic or polycarboxylic acids and on aliphatic or cycloaliphatic diols or polyols.

As starting acid component, the polyesters used in accordance with the invention comprise at least one aliphatic or cycloaliphatic dicarboxylic acid or polycarboxylic acid or derivatives thereof, such as cycloaliphatic 1,2-dicarboxylic acids, for example 1,2-cyclohexanedicarboxylic acid or methyltetrahydrophthalic, tetrahydrophthalic or methylhexahydrophthalic acid, succinic acid, sebacic acid, undecanedioic acid, dodecanedioic acid, adipic acid, azelaic acid, pyromellitic acid, trimellitic acid, isononanoic acid and/or dimer fatty acid.

Optionally, furthermore, as well as the aliphatic or cycloaliphatic dicarboxylic or polycarboxylic acids or derivatives thereof, the polyester used in accordance with the invention may comprise further—for example aromatic—dicarboxylic acids or polycarboxylic acids. Examples of suitable aromatic acids are phthalic acid, isophthalic acid or terephthalic acid. The fraction of the aliphatic or cycloaliphatic dicarboxylic acids or polycarboxylic acids in the acid component of the polyesters used in accordance with the invention is at least 35 mol %, based on the sum of all dicarboxylic or polycarboxylic acids, preferably at least 45 mol %, in one especially preferred embodiment, 100 mol %; in other words, with very particular preference, the polyester is based exclusively on aliphatic or cycloaliphatic dicarboxylic acids or polycarboxylic acids.

In the context of the present invention, the concept of derivatives of the dicarboxylic acid or polycarboxylic acid refers preferably to the respective anhydrides or esters, especially methyl esters or ethyl esters.

The diols or polyols are aliphatic or cycloaliphatic diols or polyols, such as, for example, monoethylene glycol, diethylene, dipropylene, triethylene or tetraethylene glycol, 1,3-propanediol, 1,2-propanediol, 1,4-butanediol, 1,5-pentanediol, 1,6-hexanediol, 1,9-nonanediol, 1,12-dodecanediol, 1,3-butylethylpropanediol, 2-methyl-1,3-propanediol, cyclohexanedimethanol or neopentyl glycol. They may also be oligomeric diols such as oligoethylene glycol, oligopropylene glycol and further oligoethers.

Polyols having more than two functional groups may be used as well, such as trimethylolethane, trimethylolpropane, pentaerythritol or glycerol, for example. Moreover, lactones and hydroxycarboxylic acids may be used as diols or polyols.

Preference is given for example to the use of 1,3-methylpropanediol, 2,2'-dimethylpropane-1,3-diol, neopentyl glycol, ethylene glycol, 1,6-hexanediol and/or trimethylolpropane as aliphatic or cycloaliphatic diols or polyols.

The polyesters used in the formulations of the invention preferably have an acid number, determined according to DIN EN ISO 2114, of between 0 and 10 mg KOH/g, preferably 0 to 5 mg KOH/g, more particularly 0 to 3 mg KOH/g. The acid number (AN) is understood to be the amount of potassium hydroxide in mg that is needed to neutralize the acids present in one gram of solid. The sample under analysis is dissolved in dichloromethane and titrated with 0.1 N ethanolic potassium hydroxide solution against phenolphthalein.

The polyesters used in the formulations of the invention have an OH number between 15 to 150 mg KOH/g, preferably between 20 and 100 mg KOH/g.

For the purposes of the present invention, the OH numbers are determined according to DIN 53240-2. With this method, the sample is reacted with acetic anhydride in the presence of 4-dimethylaminopyridine as catalyst, with the hydroxyl groups being acetylated. This produces one molecule of acetic acid per hydroxyl group, whereas the subsequent hydrolysis of the excess acetic anhydride yields two molecules of acetic acid. The consumption of acetic acid is determined by titrimetry from the difference between the main value and a blank value, which is to be carried out in parallel.

The resulting number-average molecular weights Mn are from 1000 to 10 000 g/mol, preferably 2000 to 7000 g/mol.

The molecular weight for the purposes of the present invention is determined by means of gel permeation chromatography (GPC). The samples were characterized in tetrahydrofuran as eluent in accordance with DIN 55672-1.

Mn (UV)=number-average molar weight (GPC, UV detection), report in g/mol

Mw (UV)=mass average molar weight (GPC, UV detection), report in g/mol.

The polyesters used in accordance with the invention are prepared by known methods (see Dr. P. Oldring, Resins for Surface Coatings, Volume III, published by Sita Technology, 203 Gardiness House, Bromhill Road, London SW18 4JQ, England 1987), by (semi)continuous or batchwise esterification of the starting acids and starting alcohols in a single-stage or multi-stage regime.

The polyesters are preferably synthesized via a melt condensation; for this purpose, the aforementioned dicarboxylic or polycarboxylic acids and diols or polyols are introduced in an equivalent ratio of hydroxyl to carboxyl groups of 0.5 to 1.5, preferably 1.0 to 1.3, and are melted. The polycondensation takes place in the melt at temperatures between 150 and 280° C. within from 3 to 30 h, preferably in an inert gas atmosphere. Inert gas which can be used is nitrogen or noble gases, especially nitrogen. The inert gas has an oxygen content of less than 50 ppm, more particularly less than 20 ppm. First of all, a major part of the amount of water released is distilled off under atmospheric pressure. In the further course, the remaining water of reaction, and also volatile diols, are eliminated, until the target molecular weight is achieved. Optionally this may be made easier through reduced pressure, through an enlargement in the surface area, or by the passing of an inert gas stream through the reaction mixture. The reaction may additionally be accelerated by addition of an azeotrope former and/or of a catalyst before or during the reaction. Examples of suitable azeotrope formers are toluene and xylenes. Typical catalysts are organotitanium or organotin compounds such as tetrabutyl titanate or dibutyltin oxide. Also conceivable are catalysts based on other metals, such as zinc or antimony, for example, and also metal-free esterification catalysts. Also possible are further additives and process aids such as antioxidants or color stabilizers.

Examples of hydroxy-functional copolyesters suitable in accordance with the invention are the commercially available products from Evonik Industries AG, DYNAPOL® LH 748-02/B or DYNAPOL® LH 750-28.

In a further-preferred embodiment, the fluoropolymers and the polyesters together have an OH number of between 20 and 350 mg KOH/g, preferably between 30 and 250 mg KOH/g.

A further constituent of the formulations of the invention are crosslinkers, examples being amino resins or polyisocyanates, and also mixtures thereof.

In the case of polyisocyanates those involved are preferably isophorone diisocyanate (IPDI), hexamethylene diisocyanate (HDI), diisocyanatodicyclohexylmethane (H12MDI), 2-methylpentane diisocyanate (MPDI), 2,2,4-trimethylhexamethylene diisocyanate/2,4,4-trimethylhexamethylene diisocyanate (TMDI) and/or norbornane diisocyanate (NBDI), including blocked derivatives thereof.

Examples of a suitable crosslinker are Vestanat® EP B 1581 from Evonik Industries AG and Desmodur® BL 3175 from Bayer. Generally speaking, the amount of crosslinker is made such that the ratio between the OH groups of the binder mixture—that is, in particular, of the hydroxy-functional fluoropolymer and the polyester—and the NCO groups of the polyisocyanate is in the range from 0.5 to 1.5, preferably between 0.8 and 1.2 and more preferably between 0.9 and 1.1. The aforementioned ratio ranges apply in particular to the especially preferred combination of hexamethylene diisocyanate (HDI) as polyisocyanate and dibutyltin dilaurate (DBTDL) as crosslinking catalyst. In the case of other systems, whose components differ more significantly in respect of the respective molecular weights or number of functionalities, the stated limiting ranges should be adapted accordingly in the manner of the skilled person.

Likewise a constituent of the formulations of the invention are crosslinking catalysts. Crosslinking catalysts used are normally organotin or organobismuth compounds, such as dibutyltin dilaurate (DBTDL), or bismuth neodecanoate. Likewise used, furthermore, are tertiary amines, such as 1,4-diazabicylco[2.2.2]octane, and also non-oxidized organic acids, such as para-toluenesulphonic acid, for example.

As further important parameters for setting the desired, aesthetically effective weathering stability and also substrate protection properties of the coating, the formulations of the invention comprise up to 20 wt %, preferably up to 15 wt %, of UV absorbers, preferably of a triazine-based UV absorber, and up to 10 wt %, preferably up to 7.5 wt %, of UV stabilizers, preferably of an HALS-based UV stabilizer.

In one particularly preferred embodiment, the formulations of the invention comprise 0.5 to 15 wt % of a triazine-based UV absorber and 0.3 to 7.5 wt % of an HALS-based UV stabilizer.

The formulations of the invention can be used directly in the form as described above. Thus the formulations of the invention can be employed in the form of powder coatings, in other words in solvent-free form. This is of particular interest for the often-preferred use of powder coatings.

Furthermore, the formulations of the invention can also be used in the form of solvent-containing coatings. In this embodiment, which is likewise preferred, the formulations comprise 5 to 80 wt %, preferably up to 40 wt %, based on the formulation, of a solvent.

Solvents suitable for the formulations of the invention include in principle all solvents or solvent mixtures which are compatible with the other components used in accordance with the invention. These solvents or solvent mixtures are preferably ketones such as acetone or methyl ethyl ketone, esters such as ethyl, propyl or butyl acetate, aromatics such as toluene or xylene, or ethers such as diethyl ether or ethyl ethoxypropionate, glycol ethers and glycol esters, and also high-boiling aromatic fluids, such as Solvesso 150 from ExxonMobil Chemicals.

The formulation of the invention, moreover, may further comprise up to 40 wt %, based on the formulation, of a hydroxy-functional silicone resin. This silicone resin has an OH number of between 50 and 300 mg KOH/g, preferably between 90 and 200 mg KOH/g. With silicone resins of this kind, the heat resistance of the formulation is additionally increased. Moreover, in the case of a relatively high proportion of this component in conjunction with a slightly lower proportion of the other polymer components, the solids content of the formulation can be increased overall. An example of such hydroxy-functional silicone resins is XIAMETER® RSN-0255 from Dow Corning.

Furthermore, the formulation of the invention may further comprise up to 20 wt %, based on the formulation, of a silane-functional alkyl isocyanate or of a glycidyl-functional alkylsilane. These components contribute additionally to the adhesion properties with respect to the substrate to be coated. One preferred silane-functional alkyl isocyanate is trimethoxypropylsilyl isocyanate, which is sold, for example, by Evonik Industries AG under the name Vestanat® EP-M 95. One preferred example of a glycidyl-functional alkylsilane is 3-glycidyloxypropyltrimethoxysilane, which is available, for example, from Evonik Industries AG under the name Dynasylan® GLYMO.

Furthermore, the formulation may in particular also include inorganic particles, optionally nanoscale, primarily for the purpose of pigmentation and also for additional improvement in the scratch resistance and abrasive resistance. In this case up to 40 wt %, preferably up to 30 wt %, of these particles may be added, based on the formulation.

Besides the formulation described, substrates coated with a formulation of the invention are also part of the present invention.

In this case, the coating, following application to the respective substrate material and following subsequent drying and crosslinking, preferably has a thickness of between 0.5 and 200 µm, preferably between 2 µm and 150 µm and more preferably between 5 µm and 50 µm. There is in principle no restriction on the selection of the substrates. The formulations of the invention are used preferably for the coating of metals, optionally pretreated and/or provided with an anti-corrosion primer.

Suitable metals are especially all kinds of steel known to the skilled person, optionally pretreated and/or provided with an anti-corrosion primer, and also aluminum and other metals or alloys, provided with a coating for reasons of corrosion control.

In addition to the coating formulations already described, methods for the coating of substrates are also a subject of the present invention.

In the method of the invention for the coating of a substrate, the substrate is coated with a formulation of the invention as described above, and the coating is subsequently dried and/or calcined. In the course of these operations, the formulation constituents undergo crosslinking to form the coating of the invention.

In relation to the method for the coating of substrates with the formulations of the invention there are a number of embodiments. In the simplest embodiment, coating takes place directly onto the substrate. Used for this purpose in particular is a method in which the formulation of the invention in organic solution, together with further formulation constituents, is applied as an "organosol" to the substrate, and the layer applied is subsequently dried. Coating here takes place for example by means of knife coating, roll coating, dip coating, curtain coating or spray coating. Crosslinking of the coating takes place in parallel with the drying operation.

In one particularly preferred, though not exclusive, variant of the stated coating variant of the present invention, the formulations of the invention are used as part of coil coating procedures, also referred to as strip coating. Coil coating is a method for the single-sided or double-sided coating of flat strips—"coils"—of steel or aluminum, for example. The resulting material is a composite comprising a metallic support material, optionally pretreated and/or provided with an anti-corrosion primer, and of an organic coating. Methods and embodiments of coil coating procedures are known to the skilled person.

In a second embodiment, the coating is realized in the form of a surface coating sheet, furnished with the coating formulation of the invention, onto the respective substrate material. In this case, the first step is the firmly adhering coating of the coating formulation of the invention onto a corresponding sheet substrate material. The application of this surface coating sheet to the respective end substrate material is the next step. Here, the underside of the surface coating sheet is either coated with a self-adhesive formulation or furnished with a hotmelt or with an adhesive layer. This modification of the underside attaches to the end substrate material in temperature-assisted and pressure-assisted application.

In this way, further product features, including those of optical kind, for example, can be realized via the physical properties of the surface coating sheet. A method of this kind, moreover, is very flexible—for example, in the case of relatively large substrates to be coated, it can be employed in situ without handling of solvents or high temperatures.

In a third variant, similar to the second embodiment, the coating is realized in the form of a thermal transfer procedure of the coating formulation of the invention onto the respective substrate material.

In this case a corresponding film or paper support material is furnished in a first coating step with a release layer, which allows the inventive coating formulation, applied in a second coating step, to undergo thermal transfer onto the respective substrate material.

Optionally here, if necessary, it is possible in a third coating step to apply an adhesive layer, which ensures proper adhesion of the thermal transfer layer construction on the respective substrate material.

A fourth embodiment represents solvent-free powder coating. Suitable methods and embodiments in this context are well known to the skilled person.

Optionally, the coating of the invention may subsequently be provided with one or more further functional layers. The layers in question may comprise, for example, a scratch-resistant coating, a conductive layer, an anti-soiling coating and/or a reflection-enhancing layer or other layers with optical function. These additional layers may be applied, for example, by means of physical vapor deposition (PVD) or chemical vapor deposition (CVD).

An additional scratch-resistant coating may optionally be applied for further improvement in the scratch resistance. Scratch-resistant coatings may be, for example, silicon oxide layers, applied directly by means of PVD or CVD.

Furthermore, in order to facilitate cleaning, the surface of the composite moldings may be equipped with a dirt-repellent or dirt-destroying coating, known as an anti-soiling coating. This coating as well may be applied by PVD or CVD.

As a further exemplary option, a further, comparatively thin, extremely abrasion-resistant layer is located on the coating of the invention. This layer is a particularly hard, thermoset layer having a thickness of preferably below 5 μm, more preferably of between 0.5 and 2.0 μm. For example, this layer may be produced from a polysilazane formulation.

Areas of application for the formulations of the invention are in particular in architecture, for creative design of facing and roof areas, and in surface finishing and also modelling/design of metal structures. This is especially the case in high-exposure outdoor applications, such as sports stadiums, factory/industrial-plant structures, bridge construction, transport, marine applications, etc., for example. Fundamental to these applications is the combination of "long life from an aesthetic standpoint" with the conventional criteria of high-performance corrosion control. In a further preferred embodiment, the metal structures are constituents of household appliances (white goods), more particularly of cookers, refrigerators, washing machines or dishwashers.

Even in the absence of further information it is assumed that a person skilled in the art can make very extensive use of the above description. The preferred embodiments and examples are therefore to be interpreted merely as descriptive disclosure, and certainly not as disclosure that is in any way limiting.

The present invention is explained in more detail below with reference to examples. Alternative embodiments of the present invention are obtainable analogously.

EXAMPLES

Investigations into the compatibility of polyesters and fluoropolymers:

| | | Ratio of polyester:Lumiflon LF 200F | | |
|---|---|---|---|---|
| Example | Polyester | 20:80 | 50:50 | 80:20 |
| Example 1 | P1 | extremely cloudy | extremely cloudy | extremely cloudy |
| Example 2 | P2 | extremely cloudy | extremely cloudy | extremely cloudy |
| Example 3 | P3 | clear | minimal clouding | clear |
| Example 4 | P4 | clear | clear | clear |

P1: Dynapol LH 744-23, Evonik Industries AG, polyester based on 45 mol % aliphatic dicarboxylic acid
P2: Dynapol LH 538-02, Evonik Industries AG, polyester based on 50 mol % aliphatic dicarboxylic acid and cycloaliphatic dicarboxylic anhydride
P3: Dynapol LH 748-02/B, Evonik Industries AG, polyester based on 100 mol % cycloaliphatic dicarboxylic anhydride
P4: Dynapol LH 750-28, Evonik Industries AG, polyester based on 100 mol % cycloaliphatic dicarboxylic anhydride The reported molar concentrations are based in each case on the acid component of the polyester in question Lumiflon LF 200, Asahi Glass Chemicals, hydroxy-functional fluoropolymer, based on FEVE (fluoroethylene vinyl ether)

| | | ratio of polyester:Lumiflon LF 916F | | |
|---|---|---|---|---|
| Example | Polyester | 20:80 | 50:50 | 80:20 |
| Example 5 | P1 | extremely cloudy | extremely cloudy | extremely cloudy |
| Example 6 | P2 | clear | clear | extremely cloudy |
| Example 7 | P3 | clear | clear | clear |
| Example 8 | P4 | clear | clear | clear |

Lumiflon LF 916F, Asahi Glass Chemicals, hydroxy-functional fluoropolymer, based on fluoroethylene vinyl ether (FEVE).

Sufficient compatibility with the Lumiflon LF fluoropolymer polyol component is possessed in particular by polyesters P3 and P4, which are based solely on aliphatic dicarboxylic acids and/or corresponding derivatives.

The invention claimed is:

1. A formulation for coating substrates, the formulation comprising
from 5 to 70 wt % of hydroxy-functional fluoropolymer, from 5 to 70 wt % of polyester based on aliphatic or cycloaliphatic dicarboxylic or polycarboxylic acids or derivatives thereof and on aliphatic or cycloaliphatic diols or polyols, wherein the polyester comprises 100 mol % of cycloaliphatic dicarboxylic anhydride as the aliphatic or cycloaliphatic dicarboxylic acid or polycarboxylic acid or derivatives thereof, from 2 to 25 wt % of crosslinkers, from 0.01 to 2 wt % of crosslinking catalysts, from 0.5 wt % to 15 wt % of a triazine-based UV absorber, from 0.3 wt % to 7.5 wt % of a hindered amine light stabilizer, and from 5 to 80 wt % of a solvent, wherein all the wt % based on the formulation.

2. The formulation according to claim 1, wherein the OH number of the hydroxy-functional fluoropolymer and of the polyester together is between 30 and 250 mg KOH/g as determined according to DIN 53240-2.

3. The formulation according to claim 2, wherein the hydroxy-functional fluoropolymer is a copolymer of tetrafluoroethylene (TFE) and/or chlorotrifluoroethylene (CTFE) and of vinyl esters, vinyl ethers and/or alpha-olefins, the hydroxyl-functionality having been obtained with copolymerization of hydroxy-functional vinyl ethers and/or alpha-olefins.

4. The formulation according to claim 1, wherein the hydroxy-functional fluoropolymer is a copolymer of tetrafluoroethylene (TFE) and/or chlorotrifluoroethylene (CTFE) and of vinyl esters, vinyl ethers and/or alpha-olefins, the hydroxy-functionality having been obtained with copolymerization of hydroxy-functional vinyl ethers and/or alpha-olefins.

5. The formulation according to claim 1, wherein the formulation further comprises 5 to 40 wt % of a hydroxy-functional silicone resin.

6. The formulation according to claim 5, wherein the hydroxy-functional silicone resin has a OH number between 50 and 300 mg KOH/g as determined according to DIN 53240-2.

7. The formulation according to claim 1, wherein the crosslinker comprises amino resins, polyisocyanates, and also mixtures thereof.

8. The formulation according to claim 7, wherein the polyisocyanate is isophorone diisocyanate (IPDI), hexamethylene diisocyanate (HDI), diisocyanatodicyclohexylmethane (H12MDI), 2-methylpentane diisocyanate (MPDI), 2,2,4-trimethylhexamethylene diisocyanate/2,4,4-trimethylhexamethylene diisocyanate (TMDI) and/or norbornane diisocyanate (NBDI), including blocked derivatives thereof.

9. The formulation according to claim 1, wherein the crosslinking catalyst is selected from the group consisting of organotin and organobismuth compounds, tertiary amines or non-oxidizing organic acids.

10. The formulation according to claim 1, wherein the formulation further comprises up to 20 wt % of a silane-functional alkyl isocyanate or of a glycidyl-functional alkylsilane.

11. The formulation according to claim 1, comprising from 20 to 75 wt % of the hydroxy-functional fluoropolymer and the polyester in total, based on the formulation.

12. The formulation according to claim 1, wherein the polyester has an acid number of between 0 and 10 mg KOH/g as determined according to DIN EN ISO 2114.

* * * * *